United States Patent
Urban (10) Patent No.: US 12,418,388 B2
(45) Date of Patent: Sep. 16, 2025

(54) TRANSMITTING SIGNALS USING DIRECTIONAL DIVERSITY OVER A NETWORK

(71) Applicant: Comcast Cable Communications, LLC, Philadelphia, PA (US)

(72) Inventor: David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 55 days.

(21) Appl. No.: 17/184,121

(22) Filed: Feb. 24, 2021

(65) Prior Publication Data

US 2021/0351900 A1 Nov. 11, 2021

Related U.S. Application Data

(63) Continuation of application No. 15/445,365, filed on Feb. 28, 2017, now Pat. No. 10,965,436, which is a continuation of application No. 13/225,837, filed on Sep. 6, 2011, now Pat. No. 9,628,752.

(51) Int. Cl.
| | |
|---|---|
| H04L 5/14 | (2006.01) |
| H04B 15/00 | (2006.01) |
| H04N 7/10 | (2006.01) |
| H04N 21/2383 | (2011.01) |
| H04N 21/61 | (2011.01) |

(52) U.S. Cl.
CPC ............ H04L 5/143 (2013.01); H04N 7/10 (2013.01); H04N 7/106 (2013.01); H04N 21/2383 (2013.01); H04N 21/6118 (2013.01); H04N 21/6168 (2013.01); *H04B 15/00* (2013.01); *H04L 5/1423* (2013.01)

(58) Field of Classification Search
None
See application file for complete search history.

(56) References Cited

U.S. PATENT DOCUMENTS

| | | |
|---|---|---|
| 3,691,295 A | 9/1972 | Fisk |
| 3,963,990 A | 6/1976 | DiFonzo |
| 4,985,686 A | 1/1991 | Davidson et al. |
| 5,467,212 A | 11/1995 | Huber |

(Continued)

FOREIGN PATENT DOCUMENTS

CA 2599365 A1 * 10/2006 ................ H04J 3/16

OTHER PUBLICATIONS

Wahl, W. CATV—Transmission of analogue & digital TV Signals over Twisted Pair Premise Cabling Systems. Mar. 2006. Tyco Electronics. pp. 1-6.

(Continued)

Primary Examiner — Noel R Beharry
Assistant Examiner — Rodrick Mak
(74) Attorney, Agent, or Firm — Banner & Witcoff, Ltd.

(57) ABSTRACT

Methods and systems are disclosed for using a common frequency spectrum for simultaneous upstream and downstream communications in a network by implementing directional diversity techniques. Non-reciprocal coupling devices, such as circulators, may be configured in the network to provide unidirectional transmission of each signal to prevent interference. In some embodiments, feed-forward interference cancellation is utilized to increase signal isolation of upstream and downstream signals.

22 Claims, 10 Drawing Sheets

(56) References Cited

U.S. PATENT DOCUMENTS

| | | | |
|---|---|---|---|
| 6,112,232 A | 8/2000 | Shahar et al. | |
| 6,393,110 B1 * | 5/2002 | Price | H04M 1/76 |
| | | | 379/406.01 |
| 6,591,086 B1 | 7/2003 | Pleasant | |
| 6,622,304 B1 | 9/2003 | Carhart | |
| 6,765,931 B1 | 7/2004 | Rabenko et al. | |
| 7,007,296 B2 | 2/2006 | Rakib | |
| 7,227,932 B2 * | 6/2007 | Goodman | H04L 12/2838 |
| | | | 348/E7.051 |
| 7,577,240 B2 | 8/2009 | Goodman | |
| 7,671,720 B1 | 3/2010 | Martin et al. | |
| 2001/0037512 A1 | 11/2001 | Flickner et al. | |
| 2002/0116721 A1 | 8/2002 | Dobes et al. | |
| 2003/0117963 A1 * | 6/2003 | Wang | H04L 5/023 |
| | | | 370/465 |
| 2005/0069063 A1 | 3/2005 | Waltho et al. | |
| 2005/0207509 A1 | 9/2005 | Saunders et al. | |
| 2005/0259668 A1 | 11/2005 | Kim | |
| 2006/0245697 A1 | 11/2006 | Toillon et al. | |
| 2007/0207747 A1 | 9/2007 | Johnson et al. | |
| 2010/0251314 A1 * | 9/2010 | Olson | H04N 7/17309 |
| | | | 725/111 |
| 2011/0038429 A1 | 2/2011 | Sako et al. | |
| 2011/0065405 A1 | 3/2011 | Murakami | |
| 2011/0158081 A1 | 6/2011 | Wang et al. | |
| 2012/0106403 A1 | 5/2012 | Shimada et al. | |
| 2012/0213259 A1 * | 8/2012 | Renken | H04N 21/6168 |
| | | | 375/222 |
| 2013/0291044 A1 * | 10/2013 | Zinevich | H04N 21/44209 |
| | | | 725/111 |
| 2014/0348018 A1 | 11/2014 | Bharadia et al. | |
| 2019/0044555 A1 * | 2/2019 | Hewavithana | H04L 12/2801 |

OTHER PUBLICATIONS

Stascheit, B. The Use of Ethernet-Over-Coax in HFC Networks. 2007. Scientific Atlanta. Transmission Technologies. pp. 1-5.
Jul. 9, 2018—Canadian Office Action—CA 2,788,940.
Jul. 10, 2019—Canadian Office Action—CA 2,788,940.

* cited by examiner

TRANSMITTING SIGNALS USING DIRECTIONAL DIVERSITY OVER A NETWORK

CROSS REFERENCE TO RELATED APPLICATIONS

This application is a continuation of U.S. patent application Ser. No. 15/445,365, filed on Feb. 28, 2017, which is a continuation of U.S. patent application Ser. No. 13/225,837, filed on Sep. 6, 2011, now U.S. Pat. No. 9,628,752, which are hereby incorporated by reference in their entirety.

BACKGROUND

Communication networks have evolved over time to provide multiple mixed services to end users. Such networks, which once provided only analog broadcast television, have been adapted to provide new services such as digital television broadcasts, on-demand entertainment, interactive television, and data networking. To support different groups of users at different phases of network growth, networks have maintained support for legacy services (e.g., analog television), while simultaneously supporting new services (e.g., data networking). As new services and users are added, such networks may become bandwidth-limited.

In order to expand services further, this disclosure identifies and addresses a need to more efficiently utilize allocated frequency spectrum within communication standards, and to develop new techniques for utilizing unallocated frequency spectrum.

SUMMARY

This Summary is provided to introduce a selection of concepts in a simplified form that are further described below in the Detailed Description. This Summary is not intended to identify key features or essential features of the disclosure.

Methods and systems are disclosed for using a common frequency spectrum for simultaneous upstream and downstream communications by implementing directional diversity techniques in a wired medium.

In one embodiment, downstream video signals and upstream data signals are transmitted over the same radio frequency spectrum, but in opposite directions. Non-reciprocal coupling devices, such as circulators, may be configured in the network to provide unidirectional transmission of each signal or groups of signals to prevent interference in other undesirable effects. In another embodiment, feedforward interference cancellation may be utilized to increase signal isolation of upstream and downstream signals. These and other embodiments are further discussed below.

DETAILED DESCRIPTION

Figure 1:
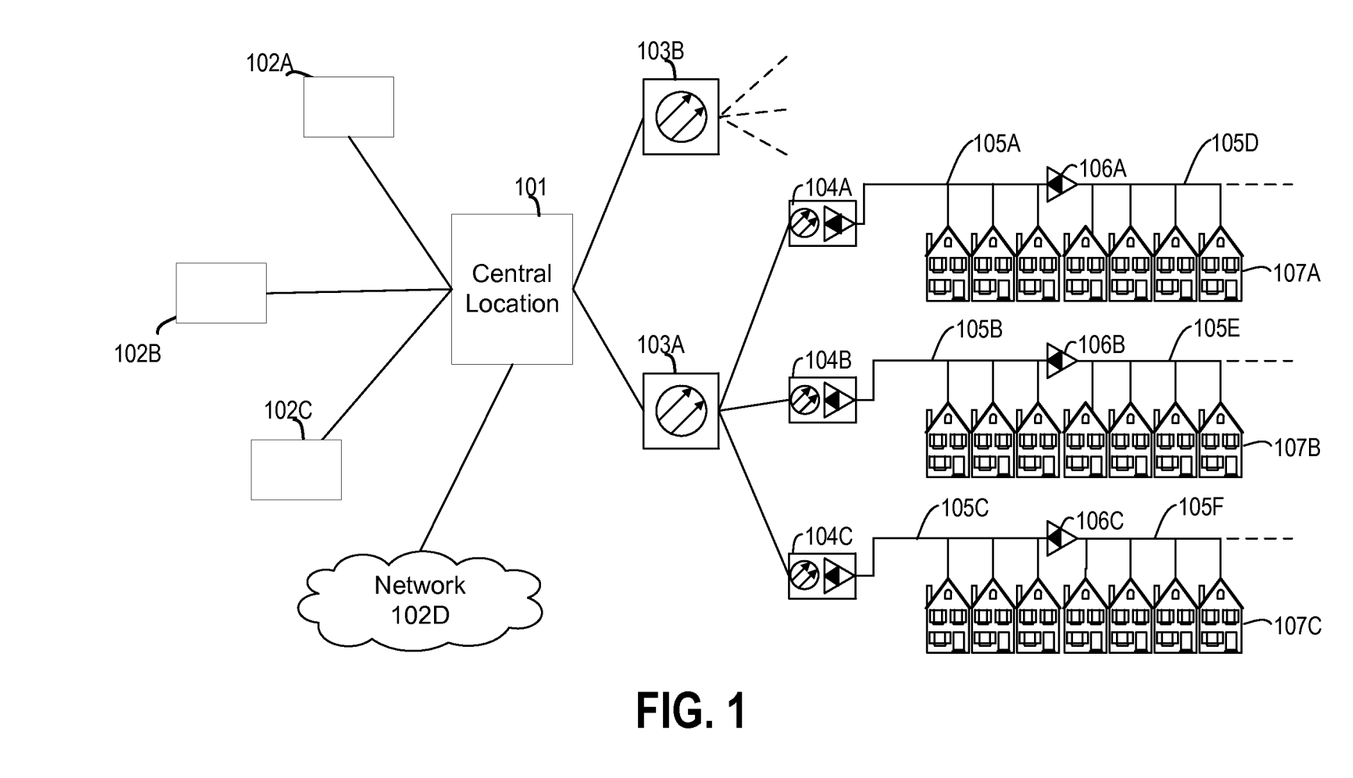
FIG. 1 illustrates a network in which various embodiments may be implemented.

FIG. 1 illustrates a data access/distribution system 100, for delivering data such as audio-visual programming to users over a communication link. Networks in the system may incorporate fiber-optic technology, wireless, co-axial cable or other technologies, or any combination thereof and two-way communication in the network to expand the network's capability. Such systems provide various services, including data, standard and high definition digital television, data networking and Internet connectivity, on-demand entertainment (e.g. Video-On-Demand (VOD)), voice-over-Internet Protocol (VOIP), interactive television, and other services.

The central location 101 operates to receive and process content (e.g., audio, video, or other data), and distribute the content to users (e.g., subscribers). The content may be received from a number of program or content providers 102a-c, through various communication media such as microwave and RF antennas, satellite links, direct-wired or wireless connections, other communication links, and/or through recordable media, for example. The central office may modulate the programs onto optical or RF signals, and transmit the modulated signals over the network plant to the users. The central office 101 may be a single facility, or may be multiple facilities, which include a number of computer servers interconnected through a local network, that operate together to perform the receiving and distribution of content.

The networks in system 100 may include in one implementation a number of fiber-optic cables that run from the central office facility 101 to optical distribution points 103A and 103B. While two optical distribution points are shown, network 100 may include any number of optical distribution points as required by the geographical areas and distances served. The fiber-optic cables carry signals in digital form as pulses of light reflected down the glass fiber-optic cable. The pulses of light may be received and repeated by the optical distribution points onto a number of additional fiber-optic cables to optical nodes 104A, 104B, 104C, and other optical nodes, which have not been illustrated for convenience.

The optical nodes convert the pulses of light carried on the fiber optic cable into RF signals having various analog and/or digital formats (e.g., NTSC, ATSC, DVB-T, etc.), which are amplified and transmitted through the coaxial cable portion of the network to serve neighborhoods of users. These neighborhoods are illustrated as 107A-C, which consist of one or more homes (e.g., 2000 homes) per optical node. System 100 may employ networks that also, or alternately, include wired links, coaxial cable, twisted shielded pair wire, additional fiber-optic cable, power lines, etc., and associated components.

Within each neighborhood, the network may include, in one aspect, a number of trunk and feeder lines 105A-F interconnected with RF amplifiers 106A-C, to individual coaxial drop lines to each home. The amplifiers 106A-C, optical nodes 104A-C, and optical distribution points 103A-B may each have the capability to transmit and receive signals in both directions, which enables the network to transmit signals, which originate from users, back to the central office 101. The two-way communication, combined with the high rate of data enabled by the fiber optics, allow the network 100 to provide interactive audio-visual services and data services.

Figure 2:
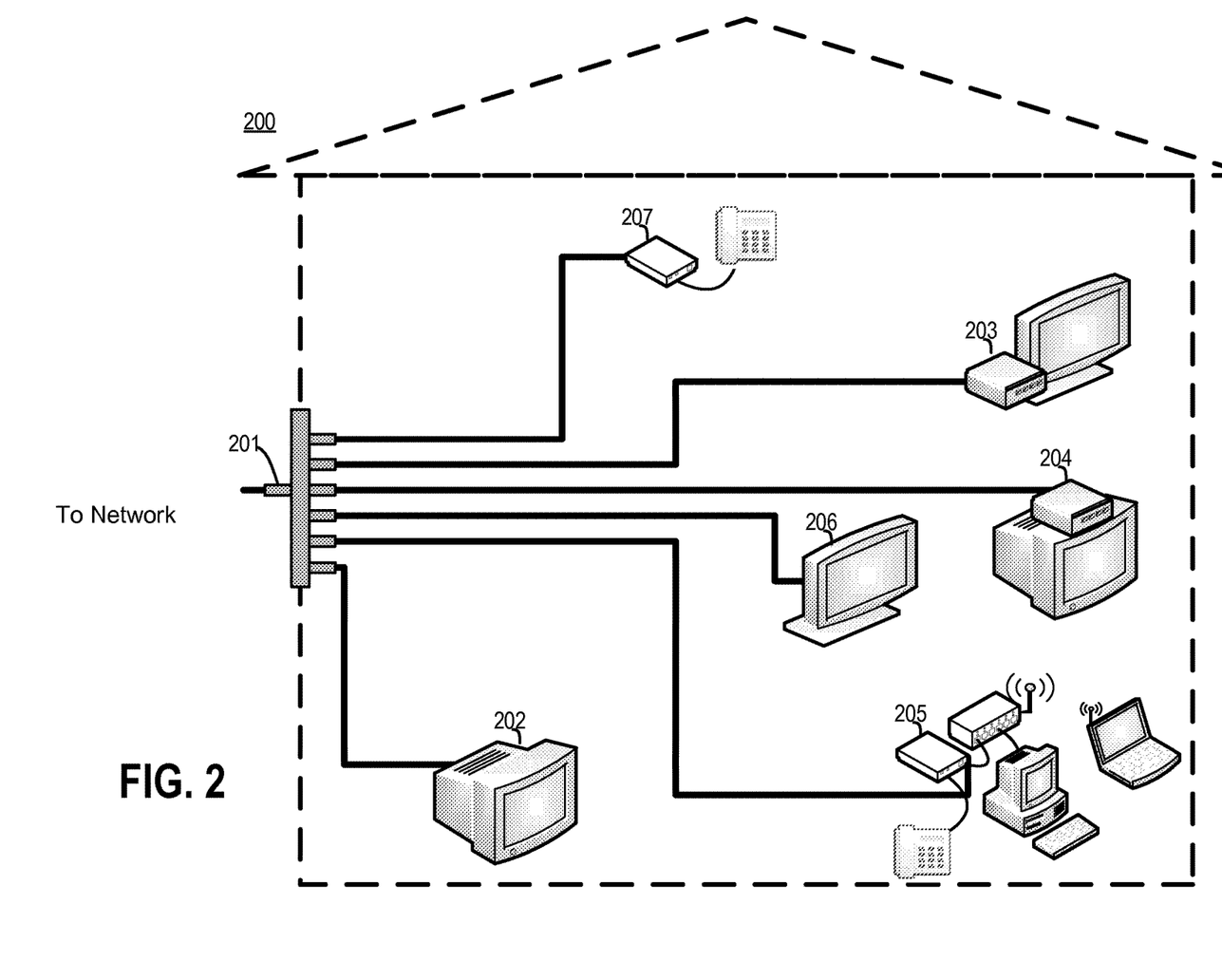
FIG. 2 illustrates a network within a building in which various embodiments may be implemented.

As shown in FIG. 2, within each home, dwelling (e.g., multi-unit dwelling) or facility connected to networks of system 100, an in-home network 200 may connect one or more user devices such as customer premise equipment (CPE) 202-207 to network 100 through a distribution network 201. Network 201 may include one or more RF couplers, amplifiers, filters and splitter, isolators, circulators, etc.

In many cases, networks 100 and 200 may have to support legacy, current, and emerging technologies simultaneously. For example, the CPEs may include analog devices, such as analog televisions and set-top boxes 202, which receive and display analog broadcasted television programs. As one example, the networks may carry National Television System Committee (NTSC) analog television 6 MHz broadcast channels. In addition to analog services, the networks may carry digital broadcast channels, which are received by digital televisions 206, digital terminal adaptors (DTAs)/set-top boxes 203, and digital video recorders (DVR) 204. The networks may further carry digital communication and interactive services, which may be accessed through devices such as cable modems/embedded multimedia terminals (eMTA) 205, voice over IP (VOIP) terminals 207, and other devices.

Figure 3A:
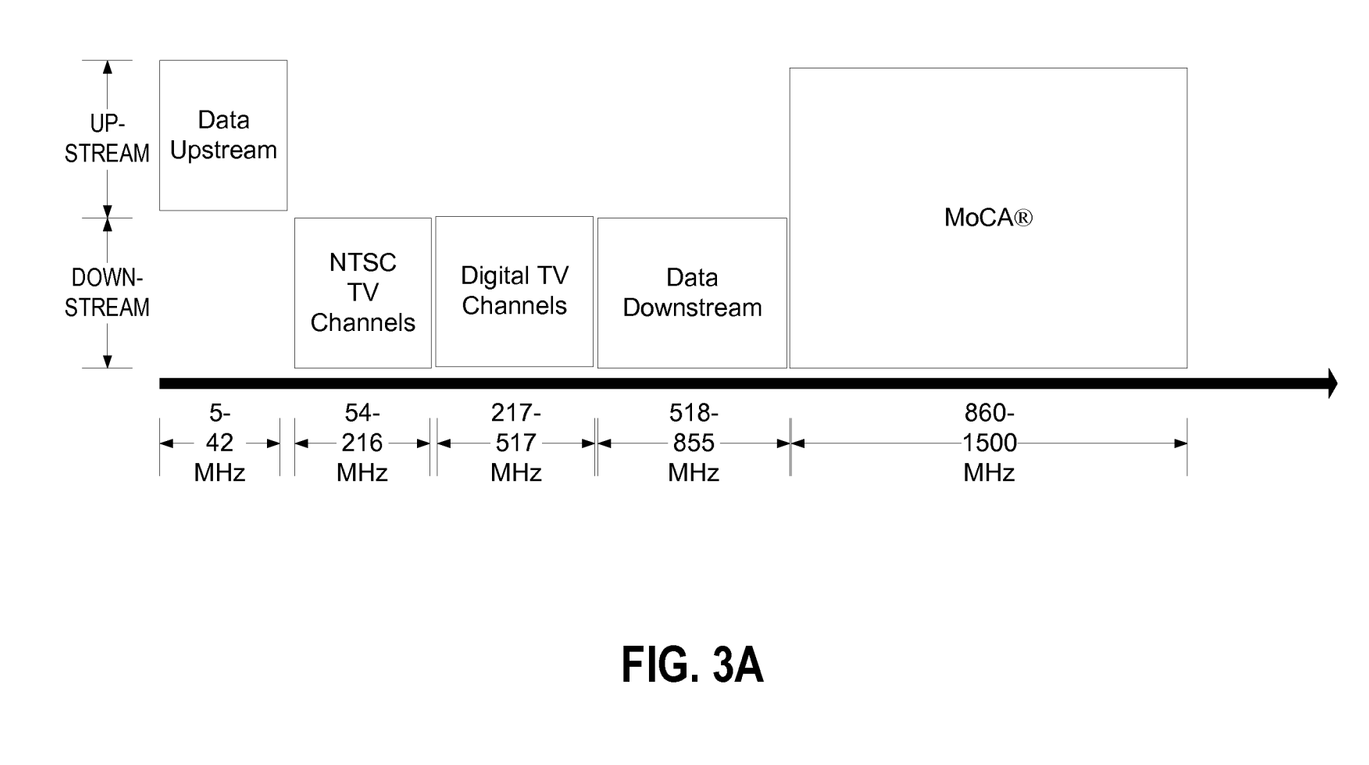
FIGS. 3A-3B illustrates a graphical depiction of an example frequency spectrum allocation in a network according to various embodiments.

To provide multiple services, the networks may support a variety of standards, such CableLabs DOCSIS® (Data Over Cable Service Interface Specification) and PacketCable® standards, MPEG-1 and MPEG-2 (Motion Picture Experts Group) standards, MOCA® (Multimedia Over Coax Alliance) standards, and other standards. FIG. 3A illustrates an example bandwidth allocation of networks 100 and 200 supporting multiple standards.

In FIG. 3A, a portion of the bandwidth (e.g., 54 MHz-855 MHz) may be portioned into, for example, 6 MHz (or other width) channels, in which signals from multiple different standards may be allocated. For example, 54-216 MHz may be allocated to National Television System Committee (NTSC) analog television broadcast channels. The bandwidth from 54 MHz to 60 MHz may be allocated to channel 2 (i.e., EIA-2), 60 MHz to 66 MHz may be allocated to channel 3 (i.e., EIA-3), etc. The bandwidth for transmitting analog channels may be selected depending on the number of analog channels and the analog standard applied. For example, the range of 54-216 MHz may include 27 channels, each having a 6 MHz bandwidth. The precise bandwidth and frequency limits of each channel may also be selected according to different standards (e.g., EIA-542B, STD, HRC, IRC, PAL, etc.), broadcasting geographical regions (e.g., North America, Japan, Europe, etc.), tuning equipment, and other considerations.

Another portion of the bandwidth shown in FIG. 3A may be allocated for digital television transmission. For example, 217-517 MHz may be allocated to Advanced Television Systems Committee (ATSC) digital television channels. Each ATSC channel may occupy a 6 MHz bandwidth similar to the NTSC channels, and each ATSC channel may each include multiple digital sub-channels. For example, the range of 217-223 MHZ may carry digital channel 23 with three sub-channels (e.g., 23.1, 23.2, and 23.3). The bandwidth for carrying digital channels may be selected depending on number of digital channels and the digital standard applied. For example, the range of 217-517 MHz may include 50 digital channels. The bandwidth and frequency limits of each digital channel may be determined according to different digital television standards (e.g., ISDB ATSC, DVB, SMB, etc.), broadcasting geographical regions (e.g., North America, Japan, Europe, etc.), tuning equipment and other considerations.

Another portion of the bandwidth shown in FIG. 3A may be allocated for high-speed data transfer. For example, 5-42 MHZ may be allocated for upstream data transfer and 518-855 MHz may be allocated for downstream data transfer. In one aspect, the data transfers may conform to a DOCSIS® service. The DOCSIS® downstream service may be partitioned in two 6 MHz channels and the DOCSIS® upstream service may be partitioned into 200 kHz, 3.2 MHz or 6.4 MHz channels. The channel width and frequency limits may be tailored according to different regional requirements, communication standards, and data requirements. For example, in North America the data (e.g., DOCSIS) downstream channels maybe 6 MHz wide, while in Europe the data (e.g., DOCSIS) downstream channels maybe 8 MHz wide to coincide with respective analog and digital transmission standards in each region.

The frequency spectrum shown in FIG. 3A may support other types of data services. For example, Multimedia-Over-Cable (MOCA®) is one type of service that allows devices (e.g., set top boxes) in a home network (e.g., Network 200) to communicate and stream data between each other. In FIG. 3A, the bandwidth from 860-1500 MHZ may be allocated for MoCA® services.

The allocation of the frequency spectrum to the various standards in FIG. 3A may be limited in two respects.

First, many of the services defined by the various standards (e.g., DOCSIS®, NTSC, ATSC, etc.) cannot share bandwidth with services of other standards. For example, the DOCSIS® standards may permit upstream communication in a frequency band of 5-85 MHZ, but for example, the DOCSIS® upstream communications cannot overlap the NTSC downstream broadcast channels from 54-85 MHZ. Likewise variations of the NTSC standard may permit analog broadcast channels below 54 MHz, however, these analog channels, cannot overlap the DOCSIS® upstream service.

In a second respect, full utilization of the network bandwidth might not be achieved due to lack of standards defined for utilizing unallocated bands of the spectrum. For example, while MOCA® may be defined for frequencies up to 1500 MHZ, a network including optical fiber coaxial cable may support communications signals up to 2000 MHz.

Figure 3B:
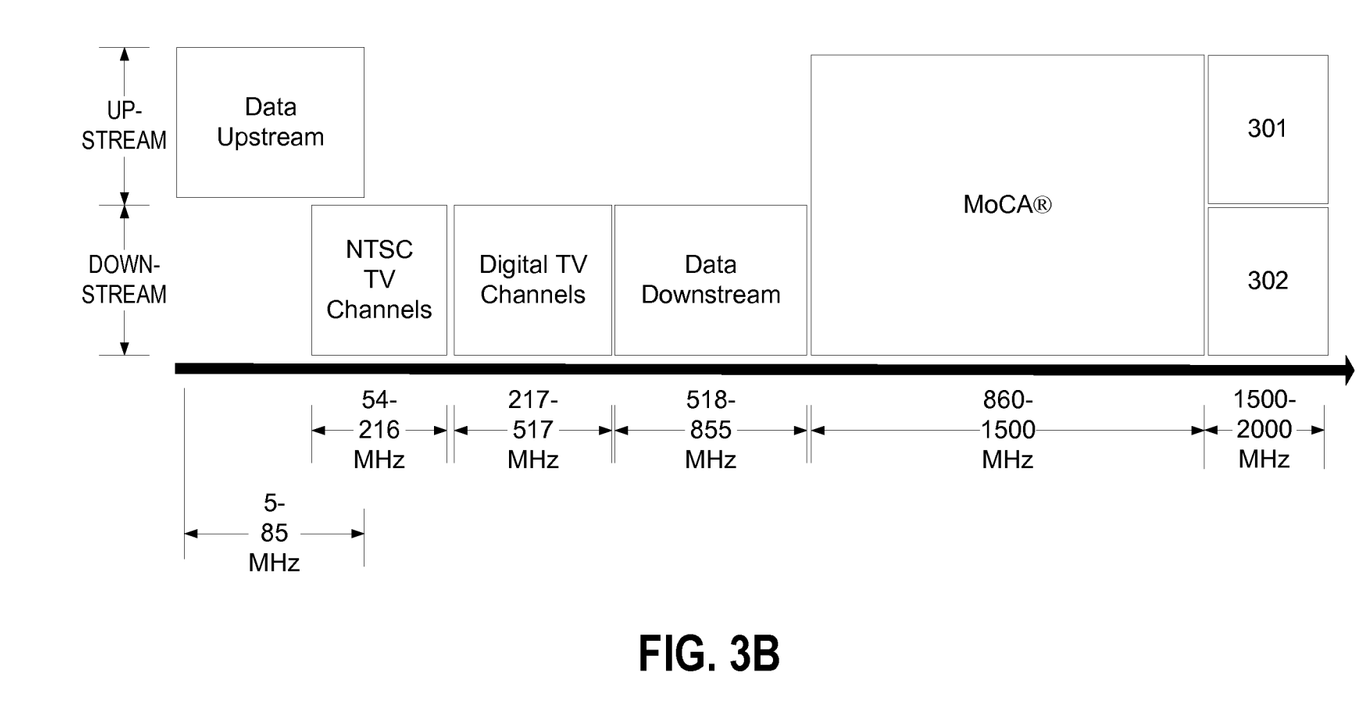

FIG. 3B illustrates a frequency spectrum allocation according to various embodiments, which improve bandwidth utilization. In one aspect, directional diversity techniques are utilized to simultaneously transmit downstream television signals and upstream data signals over the same radio frequency spectrum on a network, but in opposite directions. Directional diversity refers to the distinction between two signals transmitted on a common medium based on the signals traversing the common medium in opposite or different directions. In one embodiment, in a system employing DOCSIS® or other data standard, the data upstream communication bandwidth may be expanded to a full frequency range of 5-85 MHz defined by the standard, which map overlap downstream NTSC analog television channels in the range of 54-85 MHz. The upstream data signals may be distinguished from the NTSC analog television signal based on directional diversity.

Various aspects may include bi-directional data transmission in unassigned frequency spectrum in a hybrid fiber-coaxial or other wired network. For example, a frequency spectrum of 1500-2000 MHZ may not be utilized by any standard, but may be within the physical transmission capabilities of the network. Upstream communications 301 and downstream communications 302 may be defined to simultaneously utilize this unused frequency range, and may be distinguished using directional diversity techniques.

In other variations, the frequency spectrum may be proportioned differently. For example, the frequency spectrum may include more, less or no bandwidth for analog television signals, digital television signals, data downstream signals, DOCSIS® downstream signals and/or MoCA® signals. Certain variations, for example, may include no analog television channels. In such a case, the data (e.g., DOCSIS®) upstream communications may overlap Digital television signals or data (e.g., DOCSIS®) downstream signals assigned to frequency band of 54-85 MHz or in other frequency bands.

Figure 4:
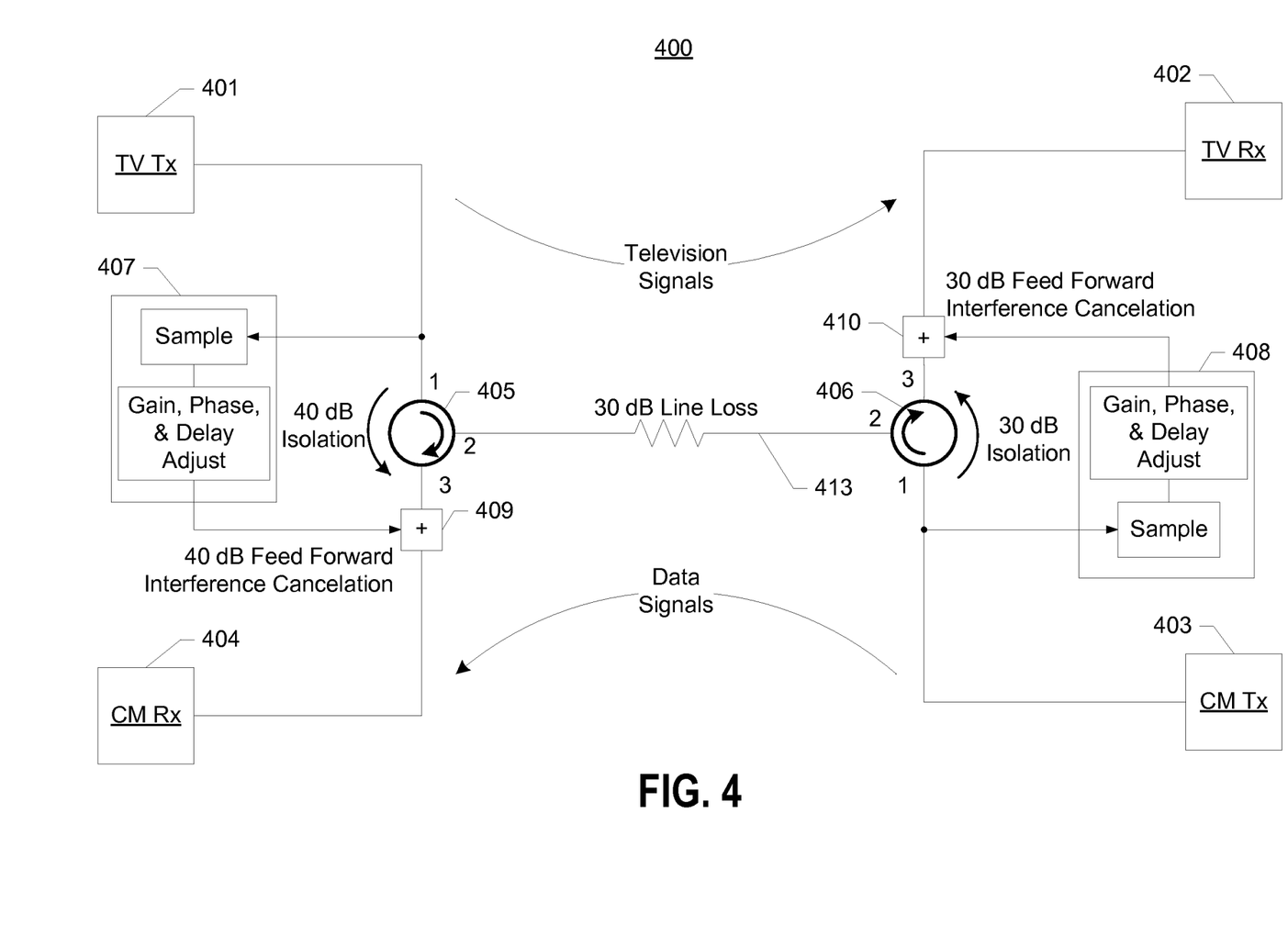
FIG. 4 illustrates a network schematic diagram according to various embodiments.

FIG. 4 illustrates a schematic of a network branch in networks 100 and 200, which may be utilized according to various embodiments to take advantage of directional diversity. In FIG. 4, non-reciprocal coupling devices, such as circulators, and/or feed forward interference cancellation circuits may be configured in the network to provide unidirectional transmission of each signal along a common network branch to prevent interference.

In FIG. 4, network branch 400 simultaneously carries downstream television or other data signals from a transmitter node 401 to a receiver node 402 and upstream data signals from a transmitter node 403 to a receiver node 404 over a common transmission path 413. Transmitter node 401 may be, for example, the central office 101 of FIG. 1 or an intermediate node within FIGS. 1 and 2 (e.g., 103A-B, 104A-C, 106A-C, 201, etc.) transmitting analog television to an end device (e.g., television 206, set top box 204, etc.). Receiver node 402 may be an end device within network 200 (e.g., television 206, set top box 204, etc.) or may be an intermediate node receiving signals from upstream in the network. While FIG. 4 illustrates the downstream signals to be television signals, the downstream signals may include any type of content such as audio, video, or other data, such as analog television, digital television, and/or downstream DOCSIS® signals (or another specification) as allocated in FIGS. 3A and 3B, or as allocated according to other frequency plans.

Data transmitter node 403 may be, for example, a cable modem 205, a VOIP terminal 207, an optical node, or other end devices, or an intermediate node such as 103A-B, 104A-C, 106A-C, 201, etc. Data receiver node 404 may be, for example, central office 101 or an intermediate node, which is upstream from transmitter node 403. Upstream data signals may include, in one embodiment, DOCSIS® signals in a frequency range of 5-85 MHZ, and/or other upstream data signals according to other standards and other frequency bands.

In various embodiments transmitter node 401 and receiver node 404 may be separate devices, or may be a common device. Likewise, transmitter node 403 and receiver node 402 may be separate devices or may be a common device (e.g., set top box 203).

In one example, distribution network 201 may be a household gateway that interfaces customer premise equipment (e.g., 202-207) to network 100, and may act as transmitter 401/receiver 404 sending television signals to, and/or receiving data signals from, downstream devices. Alternatively or additionally, distribution network 201 may act as receiver 402/transmitter 403 receiving television signals from, and/or transmitting data signal to, upstream devices.

In FIG. 4, non-reciprocal coupling devices, such as circulators 405 and 406 may be used to isolate upstream and downstream signals transmitted across path 413. The non-reciprocal coupling devices 405 and 406 are multi-port devices, which permit transmission of signals received on a first port to an adjacent port in rotation but isolate the signals received on the first port from other ports on the circulator. In certain embodiments, non-reciprocal coupling devices 405 and 406 may pass signals from ports 1 to 2, 2 to 3, and 3 to 1 with little insertion loss (e.g., clockwise), but provide high isolation for signals from ports 1 to 3, 3 to 2, and 2 to 1 (e.g., counterclockwise). Here an adjacent port in rotation (e.g., clockwise or counterclockwise) refers to how the port may be schematically illustrated, and does not refer to the geometric position of the port on the actual physical device relative to other ports on the device. The rotational directions for passing or isolating signals are chosen for convenience only. Other directional conventions may also be used to describe the devices signal behavior.

In various embodiments, the insertion loss may be typically 0.2 to 0.4 dB (for a passive device) in the clockwise direction (as illustrated), and 30-60 dB of isolation in the counter-clockwise direction over the operating frequency range of the network (e.g., 5 MHz to 2 GHz). The exact insertion loss and isolation values depend on the application and design of the circulator device. Such devices may include coaxial, waveguide, and/or optical type circulators and may include passive materials (e.g., ferrites) and/or active circuits for conditioning the signals.

In FIG. 4, a signal transmitted from transmitter 401 will pass through device 405, path 413, and device 406 to receiver 402 with a signal loss predominantly resulting from the line loss of path 413. In contrast, the signal transmitted from transmitter 401 will be isolated by at least 40 dB from data receiver node 404 due to the isolation from device 405 in the counter-clockwise direction. In a similar fashion, signals transmitted from transmitter node 403 will pass to receiver node 404 with signal loss predominantly due to only the line loss of path 413, while at the same time being isolated by at least 30 dB from node 402.

Using feed forward interference cancellation techniques, the transmitted signals may be further isolated from the unintended receivers. In one embodiment, signals transmitted from node 401 are sampled at port 1 of device 405 by interference cancellation circuit 407. The sampled signals are adjusted in gain, phase, and delay by circuit 407, summed at node 409 with signals from port 3 of device 405, and output to receiver node 404. Interference cancellation circuit 407 adjusts the sampled signals such that they cancel signals that propagate through device 405 from port 1 to port 3. In various embodiments, this feed forward interference cancellation may provide an additional 40 dB of isolation. In a similar fashion, circuits 408 and 410 may provide an additional 30 dB of isolation at node 402 from signals transmitted from node 403.

Devices 407 through 409 may include a combination of the analog and digital electronics. For example, the sampling circuit 407 may consist of discrete inductors and capacitors or parallel microstrip lines on printed circuit board forming a directional coupler, or other equivalent device. The addition circuit shown in the figure as block 409 may also be a printed circuit, lumped element directional coupler, or other equivalent device. Circuits 407 and 409 cancel the interference by adding a signal equal in amplitude and time delay, and 180 degrees out of phase with the interference from 401. In one embodiment, circuit 407 may comprise gain adjust circuitry (e.g., a PIN diode attenuator that includes devices whose resistance changes with current), phase adjust circuitry (e.g., varactor diodes whose capacitance changes with voltage), and time delay circuitry (e.g., a delay line such as a meandering transmission line formed with a high dielectric substrate in order to get the maximum time delay in the minimum amount of space). The circuitry in 407 may create a larger time delay than the path though the circulator 405 ports 1 to 3. In some implementations, to adjust for this larger time delay, a time delay circuit is placed between element 405 and 409 in addition to, or instead of the time delay circuit in 407.

In other embodiments, element 407 can alternatively or additionally be implemented with an analog to digital converter to sample the signal at port 1 of 405, a digital signal processor to perform gain, time delay, and phase adjustment on the sampled converted signal, and a digital to analog converter and amplifier to output the signal to 409. In this case, the gain, phase and time delay circuits are mathematical representations of the above analog circuits, which are operated on by the digital signal processor.

Figure 5:
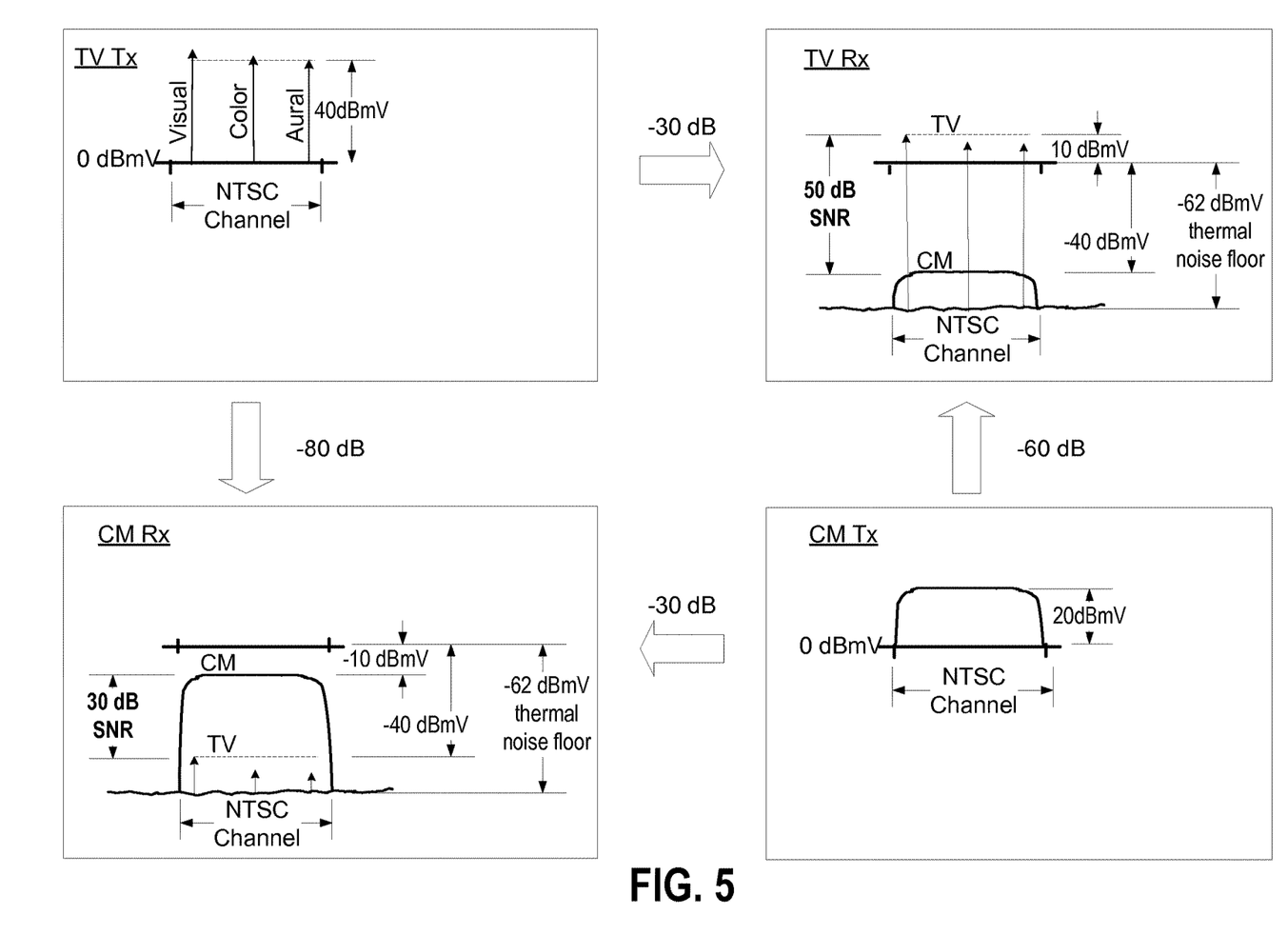
FIG. 5 illustrates graphical representations of signals carried over the network of FIG. 4 according to various embodiments.

FIG. 5 illustrates example signal levels transmitted between nodes in the embodiment illustrated in FIG. 4. The graph labeled TV TX illustrates an example NTSC analog television signal transmitted from node 401. The NTSC television signal bandwidth may be 6 MHZ (e.g., 54-60 MHz for channel 2) and may include visual, color, and aural signals transmitted at levels of +40 dBmV. The graph labeled CM TX illustrates an example broadband data signal transmitted from node 403 over the same 6 MHz band as the signal transmitted from node 401. In one embodiment, the data signal may be transmitted at a level of +20 dBmV.

The graph labeled TV RX illustrates the transmitted signals received at receiver node 402. In the graph the NTSC television signals transmitted from 401 are received at node 402 attenuated by 30 dB. The attenuation is substantially due to the line loss of path 413 (assuming negligible loss through devices 405 and 406). Also illustrated in this graph are the data transmission signals from node 403. As illustrated, these signals are attenuated by a combined 60 dB due to the isolation provided by device 406 and by the feed forward interference cancellation circuit 408. Assuming that node 402 is designed to receive the NTSC television signals, devices 406 and 408 provide a 50 dB signal to noise ratio of the television signals over the data signals, which are treated as noise. Also illustrated in the graph is the −53 dBmV thermal noise floor, which assumes a 75 ohm impedance, room temperature, 6 MHz bandwidth, and 4 dB noise FIG. of receiver node 402.

The graph labeled CM RX illustrates the transmitted signals received at receiver node 404. In the graph the data signals transmitted from node 403 are received at node 404 attenuated by 30 dB. This attenuation is substantially due to the line loss of paths 413 (assuming negligible lost through devices 405 in 406). Also illustrated in this graph are the data transmission signals from node 401. As illustrated, the signals are attenuated by a combined 80 dB due to the isolation provided by devices 405 and 407. Assuming that node 404 is designed to receive the data signals from node 403, devices 405 and 407 provide a 30 dB signal to noise ratio of the data signals over the television signals, which are treated as noise. Also illustrated in the graph is the −53 dBmV thermal noise floor, which assumes a 75 ohm impedance, room temperature, 6 MHz bandwidth, and 4 dB noise FIG. of receiver node 404.

In various embodiments, the television signals transmitted from node 401 may be, for example, NTSC analog television signals, and the data signals transmitted from node 403 may be upstream data signals, such as DOCSIS® data signals, both in the frequency range of 54-85 MHZ as illustrated in FIG. 3B.

Figure 6:
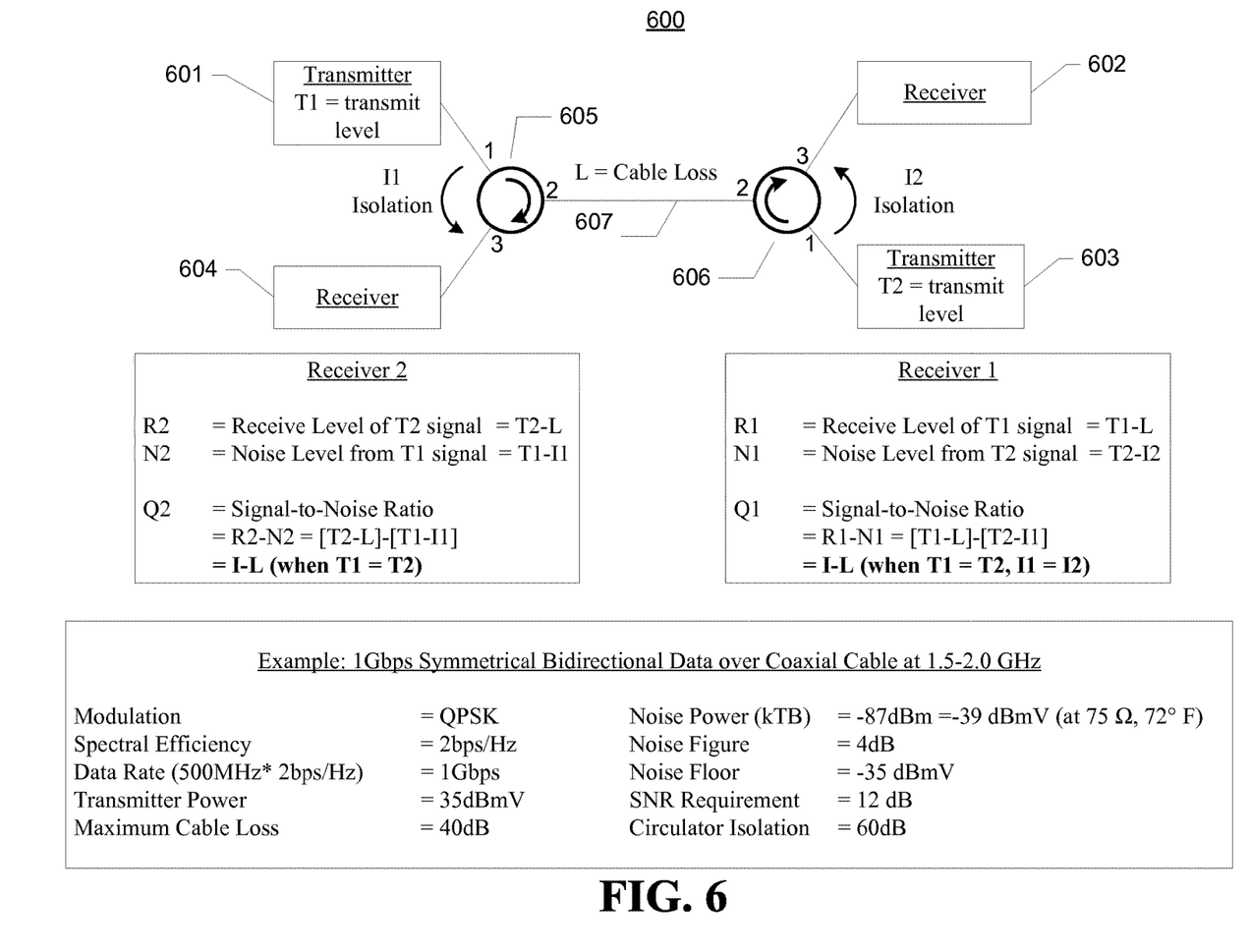
FIG. 6 illustrates a network schematic diagram and example signal parameters according to various embodiments.

FIG. 6 illustrates a schematic of another embodiment of a network branch 600 in networks 100 and 200, for example, which may be utilized according to various embodiments to take advantage of directional division duplexing. Like the network branch 400 in FIG. 4, network branch 600 that may include non-reciprocal coupling devices, such as circulators to provide unidirectional transmission to prevent interference of upstream and downstream signals along branch 600. The network branch 600 may, for example, carry the upstream signals 301 and downstream signals 302 illustrated in FIG. 3B. These signals may occupy the frequency range of 1500-2000 MHz, which might not be occupied by other standards (e.g., MoCA®, DOCSIS®, etc.) in communication networks 100 and 200.

In FIG. 6, network branch 600 may simultaneously carry downstream data signals 301 from a transmitter node 601 to a data receiver node 602 and upstream data signals 302 from a transmitter node 603 to a receiver node 604 over a common transmission path 607. Transmitter node 601 may be, for example, located at the central office 101 of FIG. 1 or an intermediate node within FIGS. 1 and 2 (e.g., 103A-B, 104A-C, 106A-C, 201, etc.) transmitting high speed data to an end device (e.g., 202-207). Receiver node 602 may be an end device within network 200 (e.g., 202-207), or may be an intermediate node receiving signals from upstream in the network.

In one example, distribution network 201 may be a household gateway that interfaces user devices such as customer premise equipment (e.g., 202-207) to network 100, and may act as transmitter 601/receiver 604 sending and/or receiving data signals to and/or from downstream devices. Alternatively or additionally, distribution network 201 may act as receiver 602/transmitter 603 receiving and/or sending data signals to and/or from upstream devices.

In various embodiments, data transmitter node 603 may be a cable modem 205, a VOIP terminal 207, other end devices, or an intermediate node such as 103A-B, 104A-C, 106A-C, 201, etc. Data receiver node 604 may be, for example, central office 101 or an intermediate node, which is upstream from transmitter node 603. In various embodiments transmitter node 601 and receiver node 604 may be separate devices, or may be a common device. Likewise, transmitter node 603 and receiver node 602 may be separate devices or may be a common device (e.g., cable modem 205).

In FIG. 6, non-reciprocal coupling devices, such as circulators 605 and 606 may be used to isolate upstream and downstream signals transmitted across path 607. Like devices 405 and 406 in FIG. 4, the non-reciprocal coupling devices 605 and 606 are multi-port devices, which permit transmission of signals received on a first port to an adjacent port in rotation but isolate the signals received on the first port from other ports on the circulator. Such devices may include coaxial, waveguide, and/or optical type circulators and may include passive materials (e.g., ferrites) and/or active circuits for conditioning the signals. In certain embodiments, non-reciprocal coupling devices 605 and 606 may pass signals from ports 1 to 2, 2 to 3, and 3 to 1 with little insertion loss, but provide high isolation for signals from ports 1 to 3, 3 to 2, and 2 to 1.

In the circuit illustrated in FIG. 6, a signal transmitted at a level T1 from transmitter 601 will pass through device 605, path 607, and device 606 to receiver 602 with a signal loss predominantly resulting from the line loss L of path 607. In contrast, the signal transmitted from transmitter 601 will be isolated from receiver 604 by device 605, which provides isolation I1 in the counter-clockwise direction. In a similar fashion, signals transmitted at a level T2 from transmitter node 603 will pass to receiver node 604 with signal loss predominantly due to only the line loss L of path 603, while at the same time being isolated from receiver 602 by device 606, which provides isolation I2 in the counter-clockwise direction.

Signal levels at the receiver 602 are illustrated in the box labeled Receiver 1. At receiver device 602, the signal level R1 of the data transmitted from transmitter device 601 may be the transmitter level T1 minus the cable line loss L (R1=T1−L, in dB). The noise level N1 at receiver 602 caused by the data transmitted from transmitter 603 may be the transmitter level T2 minus the isolation I2 provided by device 606 (N1=T2−I2, in dB). Assuming other noise at receiver 602 (e.g., thermal noise) is less than the noise caused by the signals transmitted from transmitter device 603, the signal-to-noise ratio Q1 at receiver 602 may be given by receive level R2 minus the noise level N1 (in dB). As shown in FIG. 6, when the transmitter levels T1 and T2 are equal, the signal-to-noise level Q1 can be determined as the isolation from device 606 minus the cable line loss L (Q1=I2−L).

The signal level R2 of the signal transmitted from transmitter 603, the noise N2 caused by the signal transmitted from transmitter 601, and the signal-to-noise ratio Q2 at the receiver 604 are illustrated in the box labeled Receiver 2, and are similar to those for receiver 602.

At the bottom of FIG. 6, characteristics of one embodiment are illustrated. It will be appreciated that these characteristics are illustrative only, and that other embodiments of network branch 600 may have other characteristics that depend on the specific components, data transmissions, and requirements of the other embodiments.

In the embodiment having the illustrative characteristics at the bottom of FIG. 6, the upstream signals 301 and downstream signals 302 may be modulated in QPSK format, which has a spectral efficiency of 2 bits per second per Hertz of bandwidth. Given a bandwidth of 500 MHz (e.g., 1500 MHz-2000 MHz), the maximum data rate of each upstream and downstream data link may be 1 Gigabit per second (Gbps). The system may also have a 12 dB signal-to-noise ratio requirement to achieve a desired bit error rate.

Transmission levels from transmitters 601 and 603 (T1 and T2) may be, for example, +35 dBmV and the cable loss may be 40 dB. Such a cable loss may, for example be characteristic of approximately 470 feet of RG-6 coaxial cable having an average loss of 8.5 dB per foot at 2 GHz. Isolation I1 and I2 for the circulators may be 60 dB.

In the embodiment, thermal noise power is approximated to be −39 dBmV for a 75 ohm cable at room temperature, and receivers 602 and 604 may have approximately a 4 dB noise figure. This results in an approximate thermal noise floor of −35 dBmV.

Figure 7:
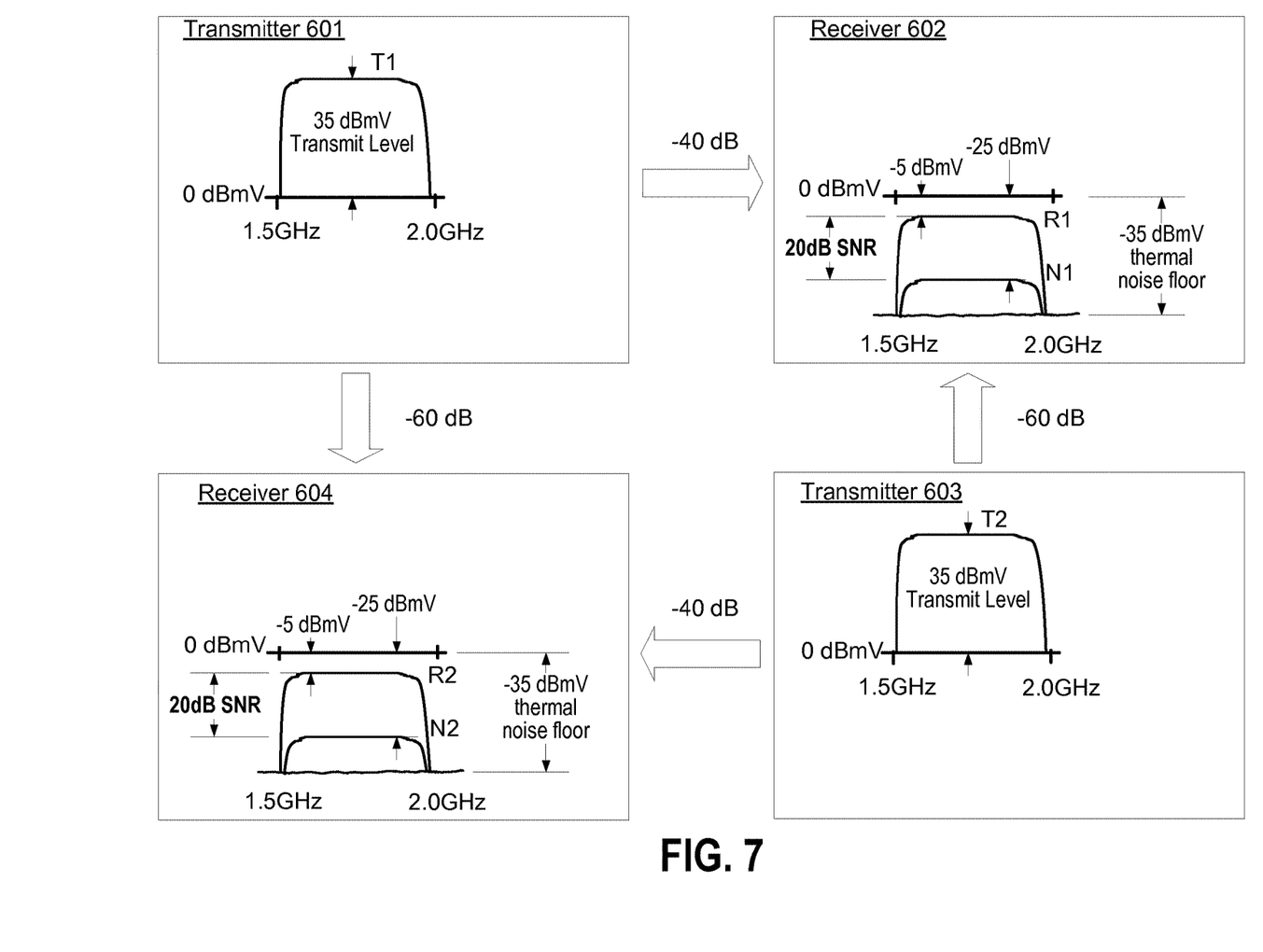
FIG. 7 illustrates graphical representations of signals carried over the network of FIG. 6 according to various embodiments.

FIG. 7 illustrates signal levels in the embodiment of FIG. 6 given the above illustrative characteristics. The graphs labeled Transmitter 601 and Transmitter 603 illustrate example data transmission signals from nodes 601 and 603 respectively over the same frequency band of 1.5-2.0 GHz. The signals may be the signals 302 and 301 respectively illustrated in FIG. 3B. In the embodiment described in FIG. 6, the signals may be broadband signals transmitted at a +35 dBmV level.

The graphs labeled Receiver 602 and Receiver 604 illustrate the transmitted signals received at receiver nodes 602 and 604 respectively. In the Receiver 602 graph the data signal transmitted from 601 (i.e., signal level T1) is received at node 602 attenuated by 40 dB (i.e., signal level R1), and the data signal transmitted from 603 is received at node 602 attenuated by 60 dB (i.e., noise level N1). The attenuation of the 601 signal at 602 is substantially due to the line loss of path 607 (assuming negligible loss through devices 605 and 606), and the attenuation of the 603 signal at receiver 602 is substantially due to the isolation provided by device 606 in the counter-clockwise direction.

Similarly, in the Receiver 604 graph the data signal transmitted from 603 (i.e., signal level T2) is received at node 604 attenuated by 40 dB (i.e., signal level R2), and the data signal transmitted from 601 is received at node 604 attenuated by 60 dB (i.e., noise level N2). The attenuation of the 603 signal at 604 is substantially due to the line loss of path 607 (assuming negligible loss through devices 605 and 606), and the attenuation of the 601 signal at receiver 604 is substantially due to the isolation provided by device 605 in the counter-clockwise direction.

The Receiver 602 and Receiver 604 graphs illustrate the thermal noise floor of −35 dBmV, which is below the N1 and N2 noise levels due to the signals transmitted from 603 and 601 respectively. As such, the signal-to-noise ratio may be determined as the difference (in dB) between R1 and N1, and between R2 and N2. As illustrated, the signal-to-noise ratio is 20 dB for the illustrative characteristics in FIG. 6. This provides an 8 dB margin over the required 12 dB signal-to-noise ratio of the system.

Figure 8:
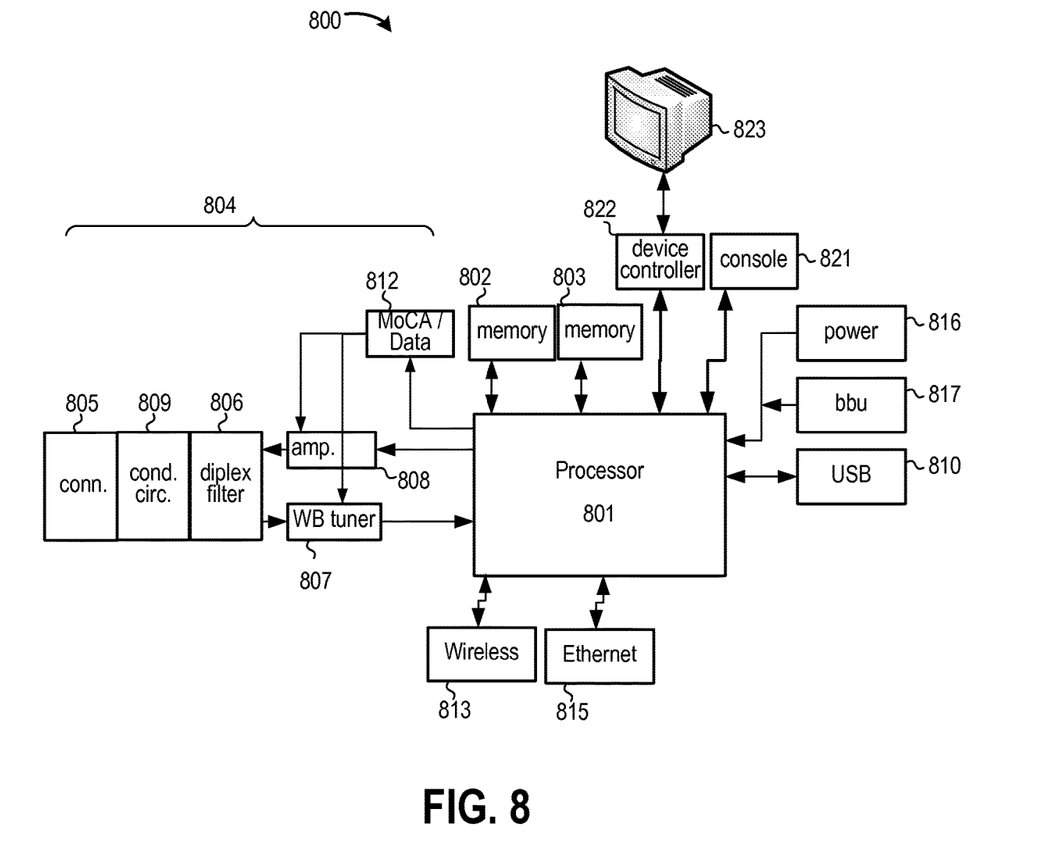
FIG. 8 illustrates a schematic block diagram of a computing platform according to some embodiments.

FIG. 8 is a block diagram of equipment 800 in which the various disclosed transmitter devices, receiver devices, gateways, servers, and other described embodiments may be implemented. For example, devices 101, 201-207, 401-404, and 601-604, may include various portions of equipment 800 for transmitting and receiving data.

A main processor 801 is configured to execute instructions, and to control operation of other components of equipment 800. Processor 801 may be implemented with any of numerous types of devices, including but not limited to, one or more general-purpose microprocessors, one or more application specific integrated circuits, one or more field programmable gate arrays, and combinations thereof. In at least some embodiments, processor 801 carries out operations described herein according to machine-readable instructions (e.g. software, firmware, etc.) stored in memory 802 and 803 and/or stored as hardwired logic gates within processor 801. Processor 801 may communicate with and control memory 802 and 803 and other components within 800 over one or more buses.

Main processor 801 may communicate with networks (e.g., networks 100 and 200) or other devices across one or more RF, microwave, and or optical interfaces 804 that may include a coaxial cable connector (or other type of connector) 805, a signal conditioning circuit 809 (e.g., filter), a diplex filter 806, a tuner 807 (e.g., wideband, narrowband, television, FM, QPSK, QAM, etc.), upstream communication amplifier 808, and one or more standard specific interfaces 812 (e.g., a MOCA® interface, a DOCSIS® interface, etc.). Main processor 801 may also communicate with other devices through additional interfaces, such as a USB interface 810, Ethernet interface 815, wireless interfaces 813

(e.g., Bluetooth, 802.11, etc.), etc. A power supply 816 and/or battery backup 817 may provide electrical power. User input to equipment 800 may be provided over one of the aforementioned interfaces (e.g., 804, 810, 813, 815, etc.), or via a separate collection of buttons, infrared ports, or other controls in a console 821. Equipment 800 may include one or more output devices, such as a display 823 (or an external television), and may include one or more output device controllers 822, such as a video processor.

Memory 802 and 803 may include volatile and non-volatile memory and can include any of various types of tangible machine-readable storage medium, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

Figure 9:
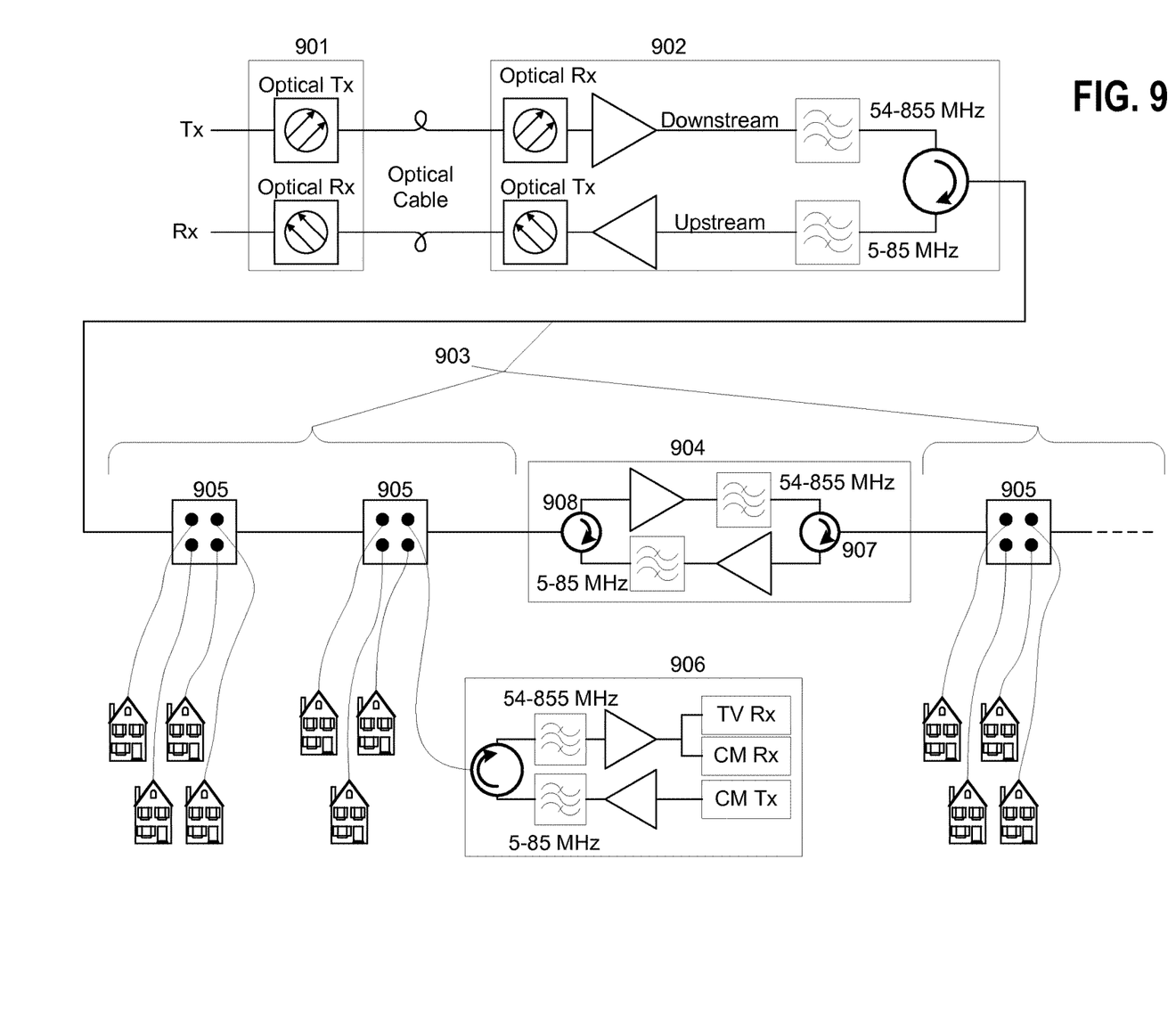
FIG. 9 illustrates a network schematic diagram according to various embodiments.

While some embodiments describe a single communication branch of a network, other embodiments include networks having multiple branches utilizing the directional disparity techniques and architectures described herein in one or more of the branches. FIG. 9 shows an embodiment including a point-to-multipoint downstream and multipoint-to-point upstream configuration using directional diversity. The architecture of FIG. 9 is similar to FIG. 1, with the components of FIG. 4 and/or FIG. 6 added. The architecture in FIG. 9 may include an optical distribution point 901, which may be the same or similar to the optical distribution points 103A and 103B shown in FIG. 1. Distribution point 901 may include an optical transmitter (Tx) for downstream transmission and an optical receiver (Rx) for upstream reception over optical cables to and from optical fiber node 902.

Node 902 may be the same or similar to nodes 104A-C illustrated in FIG. 1. Node 902 may include an optical receiver that receives an optical signal over the optical cable from 901, and converts the signal into an RF signal amplified through a downstream amplifier.

The downstream-amplified RF signal may then be filtered through a bandpass filter having a pass band in the range of the downstream signals. For example, the pass band may be 54-855 MHz to pass the NTSC TV Channels, Digital TV channels and data (e.g., DOCSIS®) downstream signals illustrated in FIG. 3B. In other embodiments, the pass band may have a different range depending on the intended downstream signals to pass.

Node 902 may also include an optical transmitter that may receive an amplified RF signal from an upstream amplifier, and may convert the amplified RF signal to an optical signal that is transmitted upstream over the optical cable to 901. The amplifier may receive upstream signals that have been filtered through a band pass filter having a pass band in the range of the intended upstream signals. For example, the pass band may be 5-85 MHz to pass the data (e.g., DOCSIS®) upstream signals illustrated in FIG. 3B. In other embodiments, the pass band may have a different range depending on the intended upstream signals to pass. The RF upstream and downstream signals may be coupled through a circulator to coaxial feeder line 903 for connection to households. The circulator may be the same or similar to the circulator 405 and 605 shown in FIG. 4 and FIG. 6, respectively.

Along the coaxial feeder path 903, one or more multi-drop hubs 905 may be included for connecting coaxial drop lines to individual end devices. Devices 905 may include directional couplers, splitter devices, etc., arranged to isolate signals from one home drop line to another home drop line and from downstream signals (e.g., regardless of direction).

Feeder path 903 may further include one or more bidirectional amplifiers 904. The amplifier may include the same or similar RF components as 902 (e.g., amplifier, filter, directional coupler, feed forward circuit, etc.) configured in a back-to-back arrangement. In 904, a downstream-connected directional coupler circuit 907 and an upstream-connected directional coupler circuit 908 separate upstream and downstream signals. The upstream signal ports of 907 and 908 are connected together through a set of one or more amplifiers and filters, and the downstream signals ports of 907 and 908 are connected together through a different set of one or more amplifiers and filters. In some embodiments, the pass band for the downstream signals may be in the range 54-855 MHz to pass the NTSC TV Channels, Digital TV channels and downstream data signals illustrated in FIG. 3B, and the pass band for the upstream signals may be 5-85 MHz to pass the data upstream signals illustrated in FIG. 3B. In other embodiments, the pass bands may have different ranges depending on the intended downstream and upstream signals.

Block 906 illustrates one configuration in a home or other facility at the end of a drop line for connection to the network. The circuit may be the same or similar to the RF circuits in 902. The downstream separated signal may connect to an analog or digital TV and/or a cable modem receiver. The upstream separated signal may connect to a cable modem transmitter.

While only a single circulator circuit for each network connection is illustrated in 902, 904, and 906 to provide separation of upstream and downstream signals, 902, 904, and 906 may include circuits such as 407 and 409 illustrated in FIG. 4 to provide further isolation using feed forward cancellation. Also, while 902, 904, and 906 show one band pass filter and amplifier for each path; 902, 904, and 906 may include multiple band pass filters and amplifiers. Further, the band pass filters may be located on either or both sides of each amplifier.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. All permutations of various features described herein are within the scope of the invention.

For example, although some embodiments are described in the context of a hybrid fiber-coaxial data distribution network, other embodiments include different types of networks. Other networks including coaxial-cable only networks, fiber-optic only networks, POTS networks, DSL networks, power line networks, other wired networks, and combinations thereof. The networks of various embodiments may also utilize various different types of physical communication media (e.g., twisted pair conductors, coaxial cable, fiber-optic cable, power line wiring, etc.).

The invention claimed is:

1. A method comprising:
   receiving, via a first port of a circuit and from a computing device, an addressed downstream signal;
   while the addressed downstream signal is being received via the first port, receiving, via a second port of the circuit and from a conductor of a network, an upstream signal;
   sampling the addressed downstream signal to produce a sampled downstream signal;
   delaying the sampled downstream signal by a time delay;
   using the sampled downstream signal to produce an attenuation signal;
   modifying the upstream signal by adding the attenuation signal; and
   sending, via a third port of the circuit, the modified upstream signal,
   wherein the first port receives the addressed downstream signal in one direction, and the second port receives the upstream signal in an opposite direction, and
   wherein a frequency range associated with the addressed downstream signal comprises frequencies that are not included in a frequency range associated with the upstream signal.

2. The method of claim 1, wherein the conductor is a wired connection, and the method comprises:
   sending the addressed downstream signal to the conductor of the network via the second port of the circuit.

3. The method of claim 1, further comprising one or more of:
   adjusting a gain of the sampled downstream signal, or
   adjusting a phase of the sampled downstream signal.

4. The method of claim 1, wherein the frequency range of the addressed downstream signal overlaps with the frequency range of the upstream signal.

5. The method of claim 1, wherein the attenuation signal corresponds to an attenuation setting of the circuit.

6. The method of claim 1, wherein the circuit comprises a 3-port circulator.

7. The method of claim 1, further comprising:
   isolating the addressed downstream signal from the upstream signal.

8. An apparatus comprising:
   first, second, and third ports, wherein:
   the first port is configured to:
     receive, from a transmitter computing device, a first addressed signal;
     send the first addressed signal to the second port; and
     isolate the first addressed signal from the third port by introducing a time delay to the first addressed signal;
   the second port is configured to:
     send the first addressed signal to a communication path;
     receive, while sending the first addressed signal to the communication path and via the communication path, a second signal; and
     send the second signal to the third port, wherein a frequency range associated with the first addressed signal comprises frequencies that are not included in a frequency range associated with the second signal; and
   the third port is configured to send the second signal to a receiver.

9. The apparatus of claim 8, wherein the first addressed signal comprises a plurality of signals modulated at a frequency range.

10. The apparatus of claim 8, wherein the first addressed signal comprises a video signal, and the second signal comprises a data signal.

11. The apparatus of claim 8, wherein the apparatus is further configured to:
    sample the received first addressed signal to produce a sampled first signal;
    use the sampled first signal to produce an attenuation signal; and
    modify the second signal by adding the attenuation signal.

12. The apparatus of claim 8, wherein the apparatus is further configured to perform one or more of the following:
    adjust a gain of the first addressed signal; or
    adjust a phase of the first addressed signal.

13. The apparatus of claim 8, wherein:
    the first addressed signal is modulated at a first frequency range,
    the second signal is modulated at a second frequency range, and
    the first frequency range overlaps with the second frequency range.

14. An apparatus comprising:
    first, second, and third ports, wherein:
    the first port is configured to:
      receive, from a transmitter computing device, an addressed downstream signal;
      send the addressed downstream signal to the second port; and
      isolate the addressed downstream signal from the third port by introducing a time delay to the addressed downstream signal;
    the second port is configured to:
      send the addressed downstream signal to a communication path;
      receive, while sending the addressed downstream signal to the communication path and via the communication path, an upstream signal; and
      send the upstream signal to the third port, wherein a frequency range associated with the addressed downstream signal comprises frequencies that are not included in a frequency range associated with the upstream signal; and
    the third port is configured to send the upstream signal to a receiver.

15. The apparatus of claim 14, wherein the addressed downstream signal comprises a plurality of signals modulated at a frequency range.

16. The apparatus of claim 14, wherein the apparatus is further configured to:
    sample the received addressed downstream signal to produce a sampled downstream signal;
    use the sampled downstream signal to produce an attenuation signal; and
    modify the upstream signal by adding the attenuation signal.

17. The apparatus of claim 14, wherein the apparatus is further configured to perform one or more of the following:
    adjust a gain of the addressed downstream signal; or
    adjust a phase of the addressed downstream signal.

18. The apparatus of claim 14, wherein:
    the addressed downstream signal is modulated at a first frequency range, the upstream signal is modulated at a second frequency range, and the first frequency range overlaps with the second frequency range.

19. The method of claim 1, wherein the upstream signal is received from a coaxial cable of the network, and wherein the modified upstream signal is sent via another coaxial cable.

20. The method of claim 1, wherein the addressed downstream signal comprises internet data addressed to a device associated with the circuit.

21. The method of claim 1, wherein the upstream signal comprises video data.

22. The method of claim 1, wherein the time delay is based on a delay associated with producing the attenuation signal.

* * * * *